(12) United States Patent
Srinivas et al.

(10) Patent No.: US 7,380,172 B2
(45) Date of Patent: May 27, 2008

(54) EXPERT SOFTWARE DIAGNOSTIC TOOL

(75) Inventors: Nelamangala Krishnaswamy Srinivas, Sammamish, WA (US); Rajat Mishra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 560 days.

(21) Appl. No.: 11/027,862

(22) Filed: Dec. 31, 2004

(65) Prior Publication Data

US 2006/0150008 A1 Jul. 6, 2006

(51) Int. Cl.
*G06F 11/00* (2006.01)
(52) U.S. Cl. .......................... 714/38; 714/47
(58) Field of Classification Search ................ 714/38, 714/47

See application file for complete search history.

(56) References Cited

U.S. PATENT DOCUMENTS

| | | | | |
|---|---|---|---|---|
| 6,865,692 B2 * | 3/2005 | Friedman et al. | .............. | 714/25 |
| 6,883,120 B1 * | 4/2005 | Banga | .......................... | 714/47 |
| 7,206,975 B1 * | 4/2007 | Wilding | ........................ | 714/47 |
| 2006/0156086 A1 * | 7/2006 | Flynn et al. | ................ | 714/712 |
| 2007/0006049 A1 * | 1/2007 | Agha et al. | ................... | 714/43 |

* cited by examiner

*Primary Examiner*—Emerson C Puente
(74) *Attorney, Agent, or Firm*—Christensen O'Connor Johnson Kindness PLLC

(57) ABSTRACT

An expert diagnostic agent for use in diagnosing intermittent and/or difficult to reproduce software failures in computing devices is disclosed. The expert diagnostic agent gathers data about the operating system of a computing device and a plurality of software components coupled to the computer operating system; applies rules to the data to identify software failures; invokes tools as needed to attempt to correct the software failures; and reports information about software failures. The expert diagnostic agent may be invoked directly or activated by certain events in computer system.

20 Claims, 8 Drawing Sheets

| CONTROL FLOW — 436 | |
|---|---|
| ID (440) | INPUT VALUES (444) |
| EU3 | 42 |
| EU1 | 6 |
| EU3 | 41 |
| EU2 | 12 |
| EU1 | 5 |

*Fig.5.*

EXPERT SOFTWARE DIAGNOSTIC TOOL

FIELD OF THE INVENTION

The present invention relates to computer software, and more particularly, diagnosing intermittent or difficult to reproduce computer software failures.

BACKGROUND OF THE INVENTION

Because of the complexity of computer software, defects may exist in a software product even though great care is taken while designing, implementing, and testing a software product. Software products include operating systems, applications, programs, device drivers, etc. Once a software product is deployed, a software defect may manifest itself as one or more software failures. Software failures lie along a spectrum ranging from software failures having clear and easily reproducible symptoms to software failures having soft and/or difficult to reproduce symptoms.

Examples of software failures with clear, easily reproducible symptoms are automatic reboots, improper system accesses, operating system lockups, pronounced or severe performance degradation, severe connectivity problems, and/or severe data corruption. Such software failures usually leave evidence in easy to find and interpret sources like: (a) the memory of a computer device; (b) files stored on magnetic disks or like storage media; and/or (c) the execution stack of the computer. Prior art tools and techniques allow software failures having clear, easily reproducible symptoms to be relatively easy to discover. As a result, the software defects that cause such software failures are relatively easy to correct. Software failures with ambiguous and/or difficult to reproduce symptoms, hereafter be referred to as "soft failures" are more difficult to discover and, thus, the defects caused by such software failures are more difficult to correct.

Examples of soft failures are a loss of control of software components which provide an interface to hardware components, a loss of control of an executing process, intermittent poor performance of an operating system or software applications, and/or intermittent connection problems. Soft failures often require substantial investigation before the symptoms are able to be reliably reproduced and analyzed to identify the software defect, or defects causing the failure. Soft failures require substantial investigation because soft failures require: (a) an understanding of most, or all, of the major components of the computing device and the operating system running on the computing device; (b)the intervention of multiple specialists; (c) expertise in the use of multiple tools; and (d) specific defect detection experience for most or all of the major components of the computing device and the operating system.

The difficulties of reproducing the symptoms of a soft failure and the difficulties of identifying a soft failure, are exacerbated when the soft failure happens on a software product installed in a customer's computer, i.e., in the field. When a soft failure happens in the field, the engineer or technician supporting the software product is often unable to gather information about the failure directly and must guide a user through an information gathering process. Besides being inconvenient for both the user and support engineer, this information gathering process is usually time consuming and expensive.

The information gathering process involves extracting and interpreting information about the computing system and its components at, or just before, the time of failure. One way to accomplish this extraction is to add ftmctions to the computer system's software to generate a memory dump when a soft failure happens. A memory dump may be considered a sort of snapshot of the condition of the computing system at the time of the failure. A memory dump is usually stored in one or more files which reside on the computer device's hard disk or other storage volume. The condition of the computing system at the time the soft failure occurred can be assessed by analyzing information in the memory dump about the various hardware and software components in the computing system.

Substantial interpretation and analysis is usually required to transform memory dump information into knowledge leading to a solution that eliminates the software defect or defects that caused the soft failure. Often such interpretation and analysis is provided by one or more computer software programmers. The programmer or programming team receives a description of the symptoms of the soft failure and the memory dump. The description and the memory dump information is used by the programmer or members of the programming team to attempt to reproduce the soft failure, deduce the cause or causes of the failure, and develop a deployable solution that keeps the failure from reoccurring.

A programmer or programming team may spend weeks or months performing the aforementioned procedure. To help reduce the time and effort programmers expend to investigate soft failures, computing systems may include one or more software tools designed to assist the programmer in diagnosing soft failures. Computer software diagnosis tools are usually designed to run in the background while a computing system is operating. Such tools gather information intermittently or when triggered by certain events. When a soft failure occurs, the gathered information is passed on to a computer system support technician, engineer or software product programmer with the hope that the gathered information will narrow the scope of investigation.

Computer software diagnosis tools can be loosely categorized by the scope of the problem domain a diagnosis tool encompasses and by the level of automation a diagnosis tool provides. FIG. 1 shows these two axes of categorization with the vertical axis representing the scope of the problem domain from strict to open-ended and the horizontal axis representing the level of automation from partial to complete.

In order to maximize the utility of a computer software diagnosis tool, it is desirable to maximize the scope of the problem domain the tool encompasses and maximize the level of automation of the tool. A computer software diagnosis tool applicable to a wide variety of problems is more desirable than a tool that is only applicable to a small number of problems, or a single problem. Further, a computer software diagnosis tool that can be operated with little or no intervention by a human operator is more desirable than a tool that must be constantly tended to by a human operator. Prior art software tools are represented in FIG. 1 by the block labeled "Existing Diagnostic Tools" while more desirable tools are represented by the block labeled "Future Software Diagnostic Tools." In FIG. 1, it can be seen that prior art software diagnosis tools have low automation, i.e., prior art software diagnosis tools require a high amount of human interaction. Further, the scope of the problem domain is strict, i.e., relatively small. In contrast, "Future Software Diagnostic Tools" i.e., desired but not yet available software tools have higher automation and a problem domain scope that is more open-ended, i.e., broader.

Although the prior art does include some software diagnosis tools and tool sets that are fairly automated and have a reasonably broad scope, in the past, such tools and tool sets have required large amounts of new and original computer software design and programming to develop. As a result, such tools tend to be expensive. Such tools also tend to be restrictively complex and difficult to operate.

What is needed is a relatively inexpensive, easy to use software diagnosis tool and associated method capable of assisting computer support personnel and computer software programmers in resolving soft failures that provides a useful level of automation and addresses a reasonably broad problem domain. The present invention is directed toward providing such a tool and method.

SUMMARY OF THE INVENTION

In accordance with the present invention, an expert diagnostic agent and related method that communicate with a computing device's operating system through an operating system analyzer are provided. The operating system analyzer is a software object capable of extracting data from an operating system by accessing functions of the operating system that return data about the operating system.

In accordance with another aspect of the invention, the expert diagnostic agent and related method communicate with software components that are a part of, or are supported by, a computing device's operating system through software component analyzers. A software component analyzer is a software object capable of extracting data from a software component by accessing functions of the software component that return data about the software component.

In accordance with yet another aspect of the invention, the principles and logic used by computer system support personnel and computer software programmers to conduct data gathering and analysis when diagnosing soft failures are encoded in a rules database. Preferably, the encoding of the principles and logic used by computer system support personnel and computer software programmers into a rules database includes a model of a healthy system. A "healthy model" comprises sets of parameters with values that characterize a computer system operating within normal design parameters.

In accordance with a further aspect of the invention, the rules database communicates with an operating system analyzer and a plurality of software component analyzers to gather data about the operating system and various software components, use the data to assess the state of the operating system and software components, make decisions based on the state of the operating system and software components, and trigger actions based on the decisions.

In accordance with another aspect of the invention, an execution unit repository is provided. An execution unit is a set of steps that, when executed, perform one or more tasks related to the analysis of a computer system. Execution units are stored in an execution unit repository in such a way as to allow reuse. An execution unit repository may contain an execution unit manifest that lists the execution units available in the repository. An execution unit repository may also contain an execution unit interpreter that reads, interprets, and executes an execution unit submitted to the interpreter.

In accordance with yet another aspect of the invention, a tool suite is provided. The tool suite contains a set of software components that interact with an operating system or software components within, or supported by, the operating system to invoke certain services provided by the operating system or software components. By invoking these services, data is generated that is useful when assessing the state of the operating system and software components within, or supported by, the operating system.

As will be readily appreciated from the foregoing description, the present invention provides an expert diagnostic agent suitable for use by computer system support personnel and computer software programmers when diagnosing soft software failures in computing systems.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a block diagram illustrating an exemplary control flow;

DETAILED DESCRIPTION OF THE PREFERRED EMBODIMENT

Figure 1:
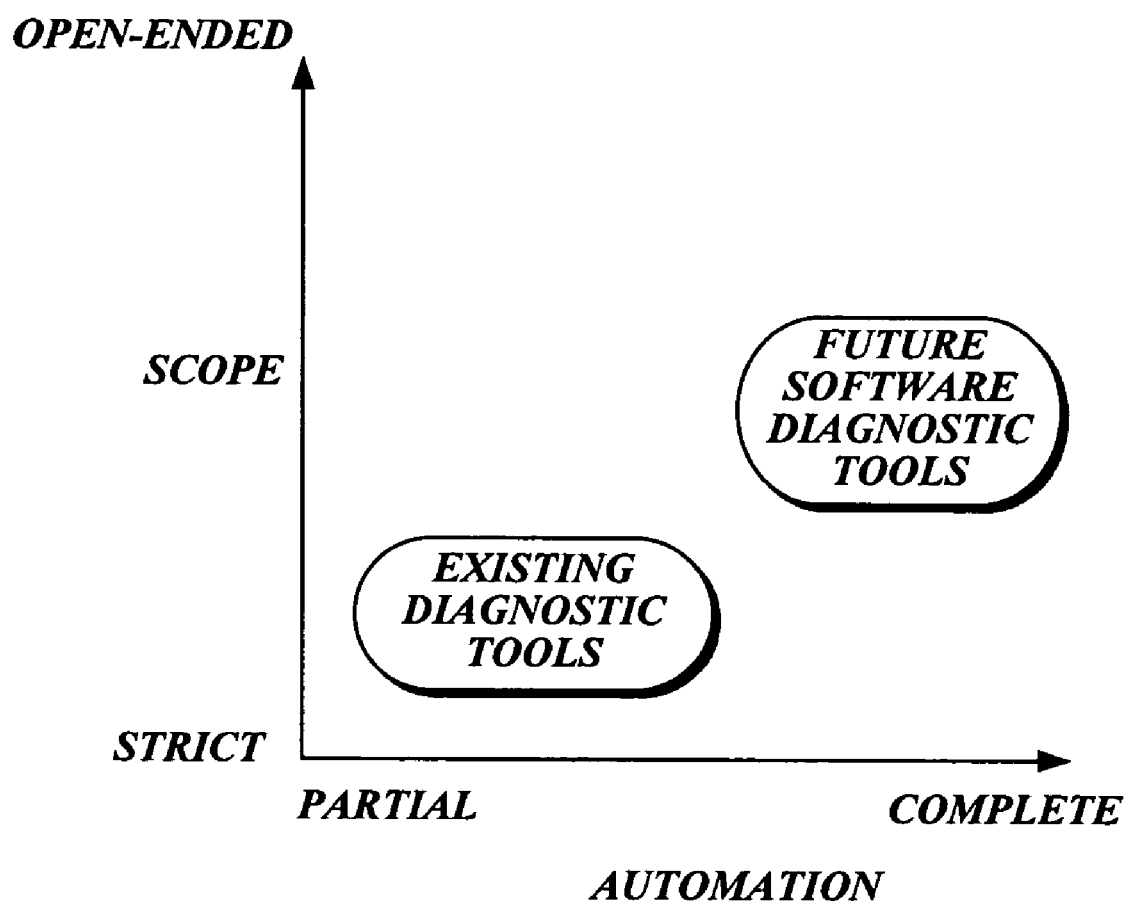
FIG. 1 is a graph illustrating the relationship between scope and automation as applied to the domain of software diagnosis tools.

Embodiments of the invention provide a computer-implementable method and apparatus (tool), including computer-readable medium for aiding in diagnosing intermittent or difficult to reproduce computer software failures, i.e., soft failures. In accordance with the graph in FIG. 1, the embodiments are classifiable as "Future Software Diagnostic Tools." Such diagnostic tools tend to operate with a higher amount of automation than prior art tools and tend to operate on broader problem domains that have less strictly defined boundaries than domains addressed by prior art "Existing Diagnostic Tools." Embodiments of the invention operate with a high amount of automation and within less strictly defined problem domain boundaries without incurring the costs and complexity associated with other software diagnostic tools that fall in a same or similar classification area.

Figure 2:
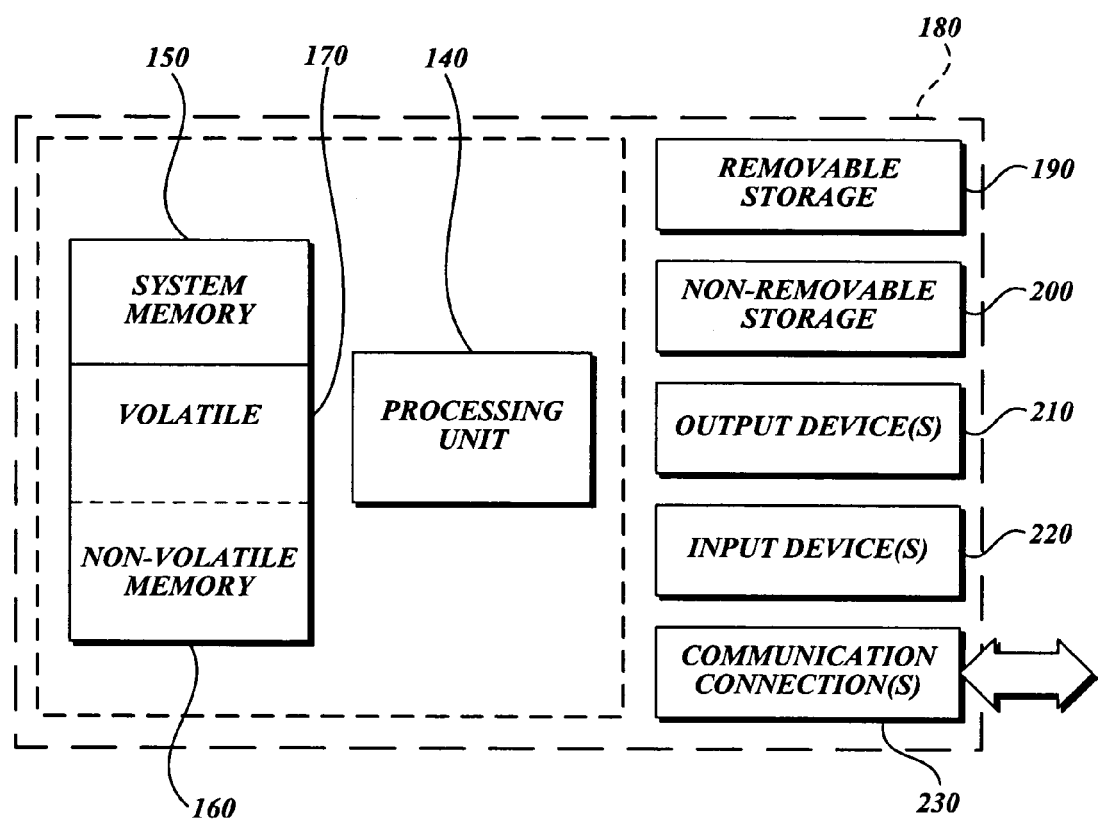
FIG. 2 is a block diagram illustrating the major components of a computing device.

FIG. 2 and the following discussion are intended to provide a brief, general description of an exemplary computing device 180 suitable for implementing various features of the invention. While the computing device will be described in the general context of a personal computer usable as a standalone computer, or in a distributed computing environment where complimentary tasks are performed by remote computing devices linked together through a communication network, those skilled in the art will appreciate that the invention may be practiced with many other computer device configurations, including multi-processor systems, mini computers, mainframe computers, and the like. In addition to the more conventional computer systems described above, those skilled in the art will recognize that the invention may be practiced on other computing devices including laptop computers, tablet computers, personal digital assistants, cellular telephones, and other computing devices that may include a graphical user interface. Such other computing devices include, but are not limited to, electronic information kiosks, in-vehicle navigation devices, printers, copiers, photographic and video cameras, and other electronic imaging or image capture devices and the like.

While the implementation of the computing system will be described in the general context of an electronic computer, those skilled in the art will appreciate the invention may be practiced with many other computer system implementations including, but not limited to, optical, photonic, pneumatic, and fluidic computers.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., and perform particular tasks or implement particular abstract data types.

In its most basic configuration, the computing device 180 typically includes a processing unit 140 and system memory 150. Depending on the exact configuration and type of computing device, system memory may include volatile memory 170 (such as RAM), non-volatile memory 160 (such as ROM, flash memory, etc.), or some combination of the two. Additionally, the computing device 180 may include mass storage (removable storage 190 and/or non-removable storage 200) such as magnetic or optical disks or tape.

Similarly, computing device 180 may also include one or more input device(s) 220, such as a mouse and keyboard, and/or output device(s) 210, such as a display. The computing device 180 may further include network connection(s) 230 to other devices, such as computers, networks, servers, etc., using either wired or wireless media. Because all of these devices are well known in the art they need not be discussed further here.

Computing device 180 typically includes at least some form of computer-readable medium, computer-readable media can be any available media that can be accessed by computing device 180. By way of example, and not limitation, computer-readable media may comprise computer storage media and communication media. As noted above, computer storage media includes volatile and non-volatile, removable and non-removable memory that stores computer-readable instructions, data structures, program modules, or other data. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage, or other magnetic storage devices, or any other medium which can be used to store desired information accessible by computing device 180. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to include information in the signal. By way of example, and not limitation, communication media includes wired media, such as a wired network or direct wired connection, and wireless media such as acoustic, RF, infrared and other wireless media. Combinations of any of the above should also be included in the scope of computer-readable media.

Figure 3:
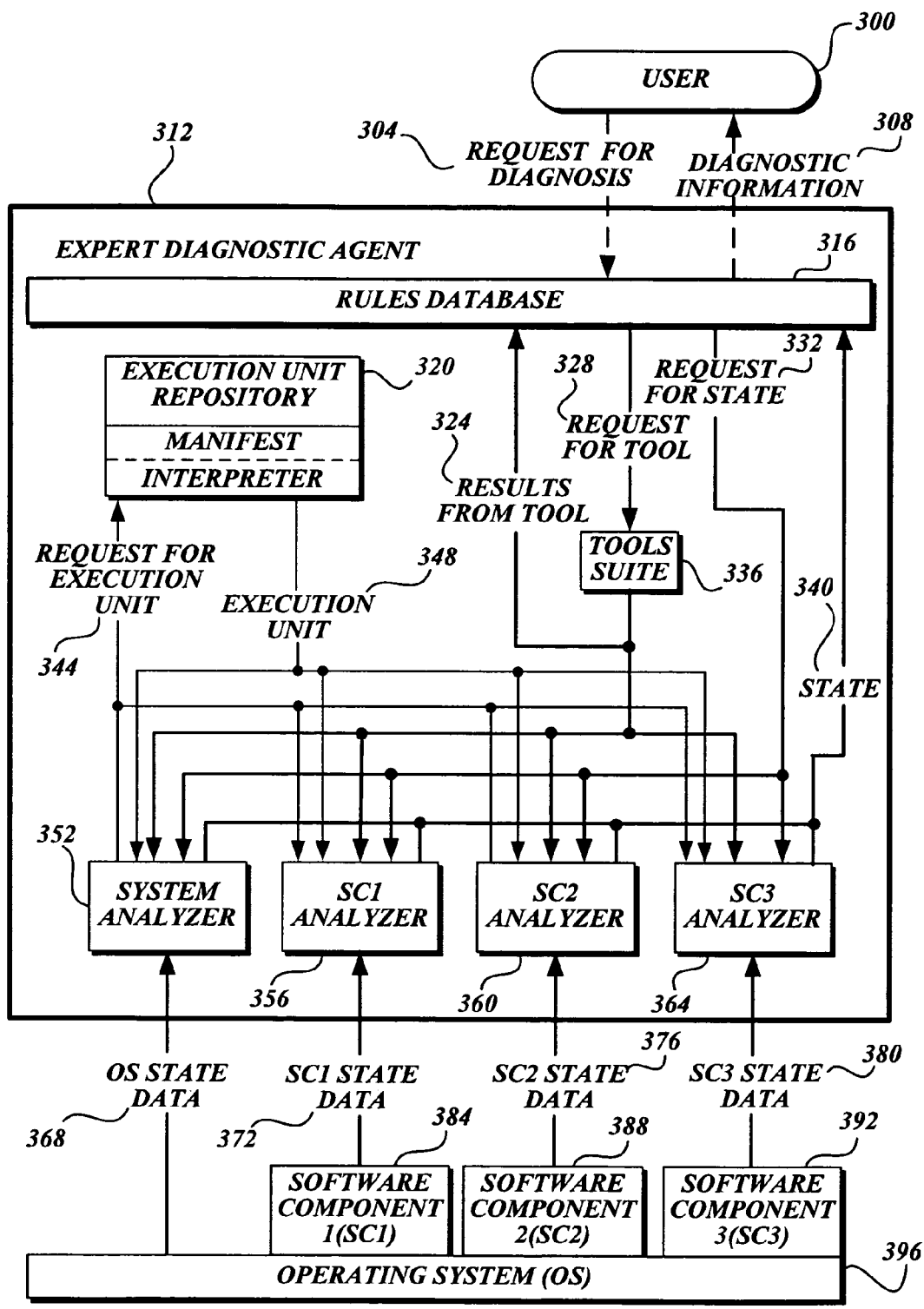
FIG. 3 is a block diagram illustrating the major components of an expert diagnostic agent.

In addition to the aforementioned physical components, the computing device 180 (FIG. 2) also contains an operating system and software components such as component drivers for the foregoing physical components. Such software components are represented in FIG. 3 by three software component blocks (SC1, SC2, and SC3) 384, 388, and 392 depicted as layered on an operating system 396. It is important to note that the software components should not be construed as limited to component drivers, i.e., software components connected to, or associated with, a physical component. Rather, the software components may be applications programs, database programs, etc., i.e., any program that interacts with the operating system of a computing device whose operation can be diagnosed in the manner described herein.

FIG. 3 also includes an exemplary embodiment of an expert diagnostic agent 312 that communicates with operating system 396 through a system analyzer 352 that forms part of the expert diagnostic agent 312. The expert diagnostic agent is a software program that, in addition to the system analyzer 352 includes a number of other modules, namely a rules database 316, and execution unit repository 320, a tools suite 336, and a plurality of software component (SC) analyzers equal in number to the number of software components to be analyzed. Since in this exemplary embodiment three software components—SC1 384, SC2 388 and SC3 392 are to be analyzed, the expert diagnostic agent 312 includes three component analyzer—an SC1 analyzer 356, an SC2 analyzer 360 and an SC3 analyzer 364. As with the system analyzer 352, the expert diagnostic agent communicates with the software components 382, 388 and 392 via the respective SC analyzer 356, 360 and 364. When a request for diagnosis 304 is submitted to the expert diagnostic agent 312 by a user 300, the expert diagnostic agent gathers state data 340 from the system analyzer 352 and the software component analyzers 356, 360 and 364 and transforms the state data 340 into diagnostic information 308, which is returned to the requester, i.e., the user 300. A more detailed description of this process follows.

As shown in FIG. 3, a user request for diagnosis 304 is submitted to a rules database 316. A rules database may also be known to those skilled in the art as a rules-based knowledge database. Regardless of nomenclature, a rules database contains rules expressed as logical statements of the form "IF <A> THEN <B>" in which "<A>" represents one or more conditional clauses and "<B>" represents one or more result clauses. The result clauses follow from the logic of, and values in, the conditional statements. An example of conditional clauses represented by <A> may be "port 80 is an HTTP port AND port 80 has not responded in the last 180 seconds." An example of a result clause <B>that follows from <A> is "rebuild port 80." The full statement of the rule would then be "IF port 80 is an HTTP port AND port 80 has not responded in the last 180 seconds THEN rebuild port 80." Those skilled in the art will appreciate that the application of such a rule is fairly limited as written here and that in order to make the rule more useful, i.e., more generally applicable, the rule must be parameterized.

The conditional clause <A> "port 80 is an HTTP port AND port 80 has not responded in the last 180 seconds" may be parameterized by substituting the value 80, i.e., the number of the port with a parameter named "portNum"; substituting the string "HTTP," i.e., the type of the port with a parameter named "portType"; and substituting the value 180, i.e., the number of seconds of the unresponsive state with a parameter named "responseTime." By making these substitutions the now more generally applicable conditional clause becomes "port <portNum> is an <portType> AND port <portNum> has not responded in the last <response-Time>." By making a similar substitution in the result clause <B>, the result clause <B> parameterized and becomes "rebuild port <portNum>." It can be seen that these parameterizations greatly increase the generality of the rule first discussed. It can also be seen that a second level of parameterization is possible by, for example, substituting the verb "rebuild" with the verb "disassemble." Making this substitution would then cause a port to be disassembled instead of being rebuilt.

A related aspect of a rules database is the concept of a "healthy system model" or "healthy model." a "healthy model" comprises values for parameters or sets of parameters that characterize normal operating limits. In the previous example, a parameter in one such set might be <responseTime> and a healthy model value of 240 seconds. The value of 240 is stored in the <responseTime> parameter of the healthy model. Constructed using the healthy model, the previous example of a parameterized conditional clause <A> becomes "port <portNum> is an <portType> port AND port <portNum> has not responded in the last 240 seconds." An important advantage of using the healthy model is that the healthy model parameter <responseTime> and the value it contains, 240, are widely accessible to a plurality of rule statements contained in the rules database, which ensures that all rule statements use the same value for a given parameter.

It is also possible to parameterize a entire clause in order to refer to the results of the execution of an analyzer or a tool. For example, the entire conditional clause <A> may be "Component Analyzer 1 returns TRUE" and the entire result clause <B> may be "run Component Analyzer 2" which, when combined produces the statement "if Component Analyzer 1 returns TRUE then run Component Analyzer 2."Including written parameterized rule statements similar to the previous examples and in a rules database allows the principles and logic used by computer system support personnel and computer software programmers to conduct data gathering and analysis when diagnosing soft failures to be encoded in a rules database.

Returning to FIG. 3, a parameterized statement similar to those described above, may also be used to cause the rules database 316 to generate a request for state information 332 and send the request to the system analyzer 352. The system analyzer 352 runs constantly or periodically in the background (depending on how the expert diagnostic agent is programmed) and gathers operating system (OS) state data 368 from the operating system 396. The system analyzer 352 transforms the operating system state data 368 into a more usable form and returns the state information 340 to the rules database. The rules database applies the returned state information 340 to one or more parameterized statements, i.e., the returned information is inserted into the appropriate <> parameters of the appropriate parameterized statements. Similarly, requests for state information 332 may be generated by the rules database 316 and sent to one or more of the software component analyzers 356, 360, and 364. Like the system analyzer 352, the component analyzers 356, 360, 364 run in the background and constantly or periodically (depending on programming) gather state data 372, 376, and 380 from their associated software components SC1 384, SC2 388, and SC3 392. As with responses to requests for state information 332 sent to the operating system 368, the state information 340 returned from a software component analyzer is sent to the rules database 316 and inserted into the <> parameters of appropriate parameterized statements.

In summary, when a request for diagnosis 304 is submitted to the expert diagnostic agent 312, the expert diagnostic agent gathers state information 340 from the operating system analyzer 352 and/or one or more software component analyzers 356, 360, and 364, transforms the gathered state information 368 and 372, 376 and/or 380 into a more usable form of state information 340. The expert diagnostic agent via the rules database 316 inserts the returned state information 340 into diagnostic information 308 that is returned to the requesting user 300.

It should be noted that although FIG. 3 shows three software components 384, 388, and 392 contained in, supported by, or otherwise coupled to the operating system 396, in an actual embodiment of the invention, there may be no software components connected to an operating system or, more than three software components may be coupled to the operating system. It should also be noted that such embodiments of the expert diagnostic agent 312 may, or may not, include a software component analyzer for each software component coupled to the operating system, i.e., in some embodiments of the invention, some software components may not include a corresponding software component analyzer.

The tools suite 336 may or may not be included in actual embodiments of the invention. The tools suite enables the rules database 316 to more directly interact with a computer system embodying an embodiment of the invention in embodiments of the invention that include a tools suite 336, when appropriate, the rules database 316 generates and sends a request for a tool 328 to the tools suite 336. In response to a request for a tool 328, the tools suite 336 activates the requested software tool and sends tool data (i.e., instructions), to the rules database 316, the system analyzer 352, and/or one or more software component analyzers 356, 360, and 364, as appropriate.

The appropriate sending of the tool data is, of course, determined by the programming of the expert diagnostic agent 312 and the tool. If the tool data is sent to the rules database, the rules database sends an appropriate state request 332 to the appropriate system analyzer 352 and/or component analyzer 356, 360, or 364. State information from the appropriate system analyzes and/or component analyzer can be returned from the analyzer or analyzers to the rules database 316 as before, or to the tools suite 336. If returned to the tools suite, the returned state information in the same or some modified form is sent to the rules database 316. As before, state information returned directly or indirectly to the rules database 316 is inserted by the rules database 316 into one or more parameterized statements. If the tool data (instructions) 324 are sent to the system analyzer 352 or one or more software component analyzers 356, 360, or 364, the receiving analyzers may transform the tool data (instructions) 324 into a form similar to a request for state 332 generated by the rules database 316. Depending on implementing tools included in the tool suite 336 may have the capability of changing the state of the operating system and/or one or more of the software components coupled to the operating system. Such implementations may allow the rule database 316 to use tools to correct software failures in either the operating system 396 or the exemplary software components 384, 388, or 382.

Figure 4:
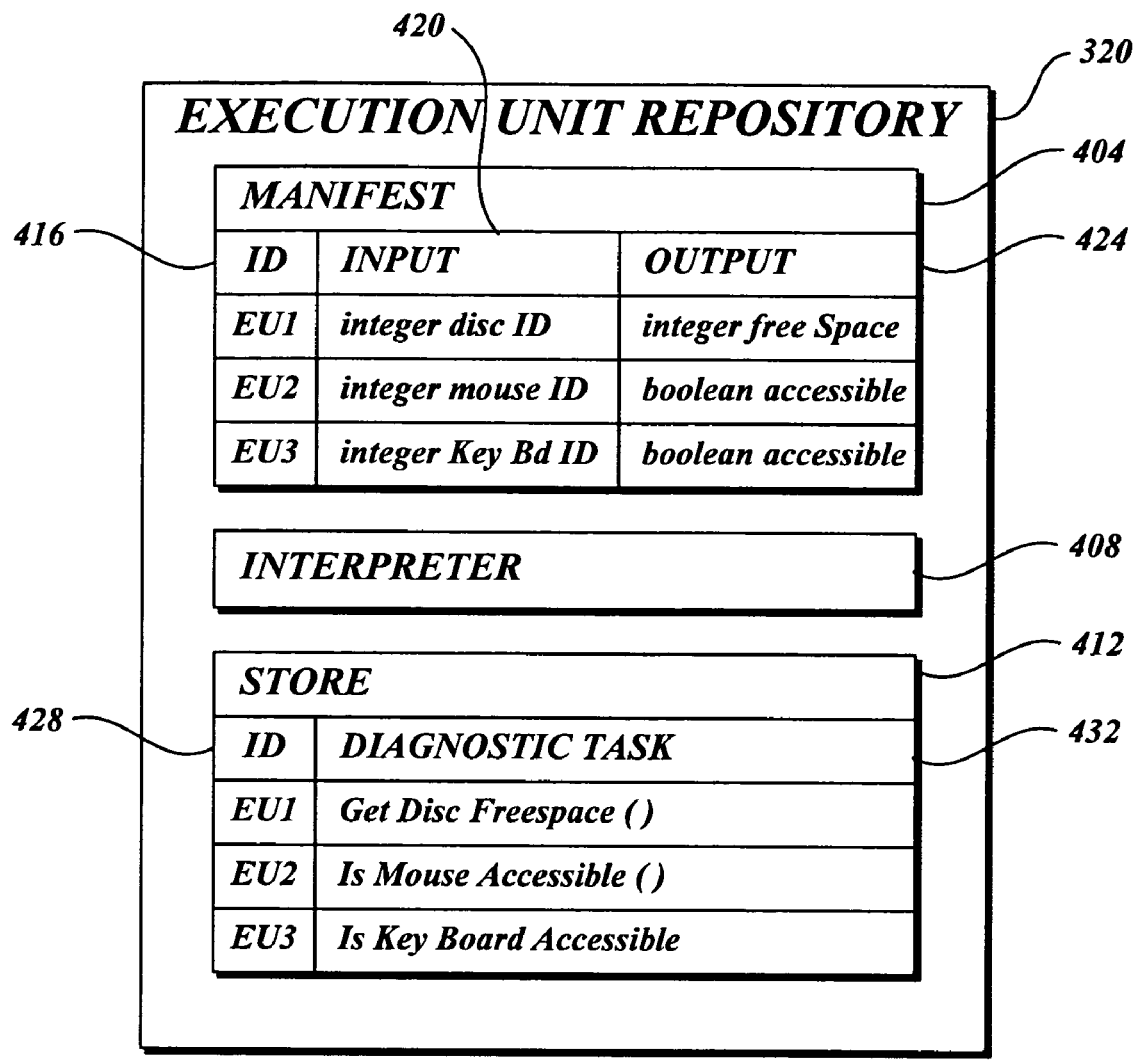
FIG. 4 is a block diagram illustrating an exemplary execution unit repository.

The execution unit repository 320 also may or may not be included in an actual embodiment of the invention. The execution unit repository enables the operating system analyzer 352 and/or the software component analyzers 356, 360, and 364 to dynamically make decisions about how to collect state data 368, 372, 376, 380 and how to transform the state data into state information 340. FIG. 4 is a more detailed view of an execution unit repository 320. As illustrated in FIG. 4, the execution unit repository 320 contains a manifest 404, an interpreter 408, and a store of execution units 412. An execution unit is software object that contains one diagnostic task but no data. A diagnostic task is a software function that may take in data, perform a task useful in diagnosis, and may generate data. Those skilled in the art will appreciate that a diagnostic task should be designed and encoded in such a way as to avoid unpredictable or uncontrolled effects on a computer system executing an instance of the diagnostic task.

The store of execution units 412 contains one copy of each unique execution unit. Each execution unit has a unique reference, i.e., an ID 428, and a diagnostic task 432. The manifest 404 is a list describing each execution unit in the store 412. An entry in the manifest 404 consists of a reference to one of the execution units in the store 412, a set of input parameters 420, and a description of the output data 424. The number and type of input parameters and the type of output data shown in FIG. 4 are exemplary and should not be construed as limiting.

Figure 5:
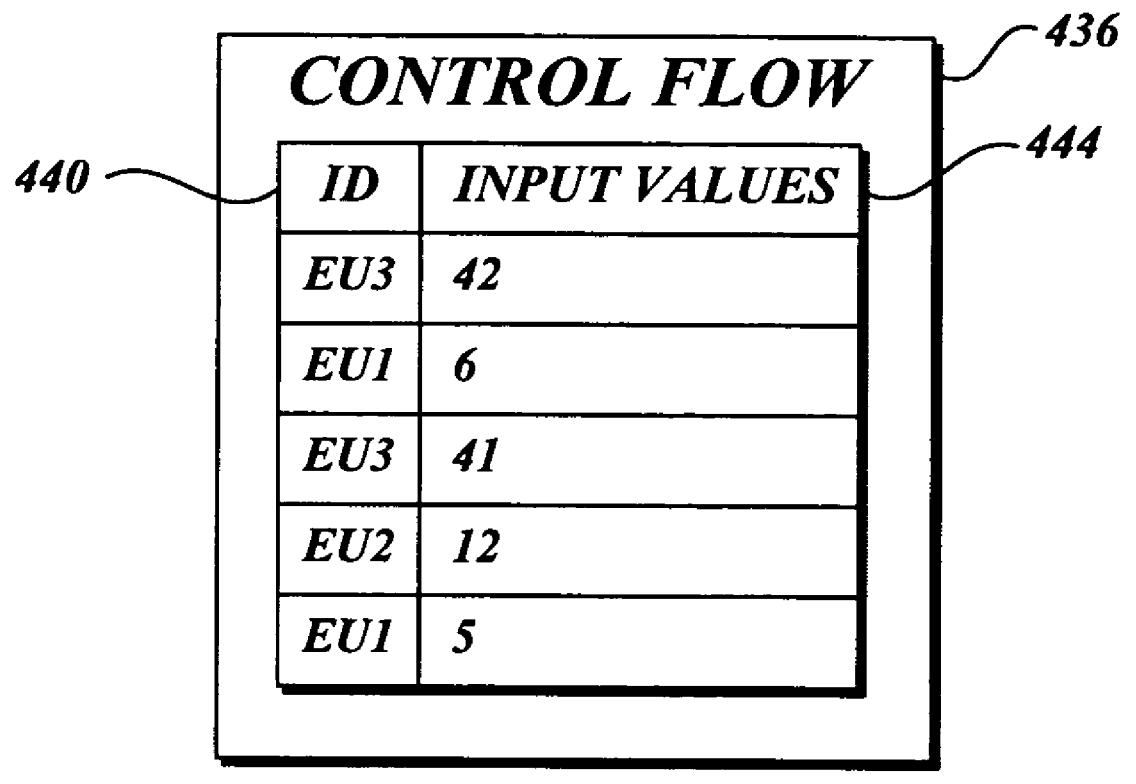

The execution unit repository is used by an analyzer, for example, the system analyzer 352, to create and execute a control flow 436, an example of which is shown in FIG. 5. A control flow 436 is a sequence of execution units. Each entry in a control flow consists of a reference, i.e., ID 440, to an execution unit contained in the execution unit repository 320 and a set of input values, the type and number of which matches a set of input parameters 420 in the manifest 404. As shown in FIG. 5, execution units may be included in a control flow 436 in any order. Further, an execution unit may be referred to more than once within a given control flow 436. Also, the output data of one execution unit may be designated as the input value to another execution unit and/or the output data may be accumulated for the entire control flow 436.

Figure 6:
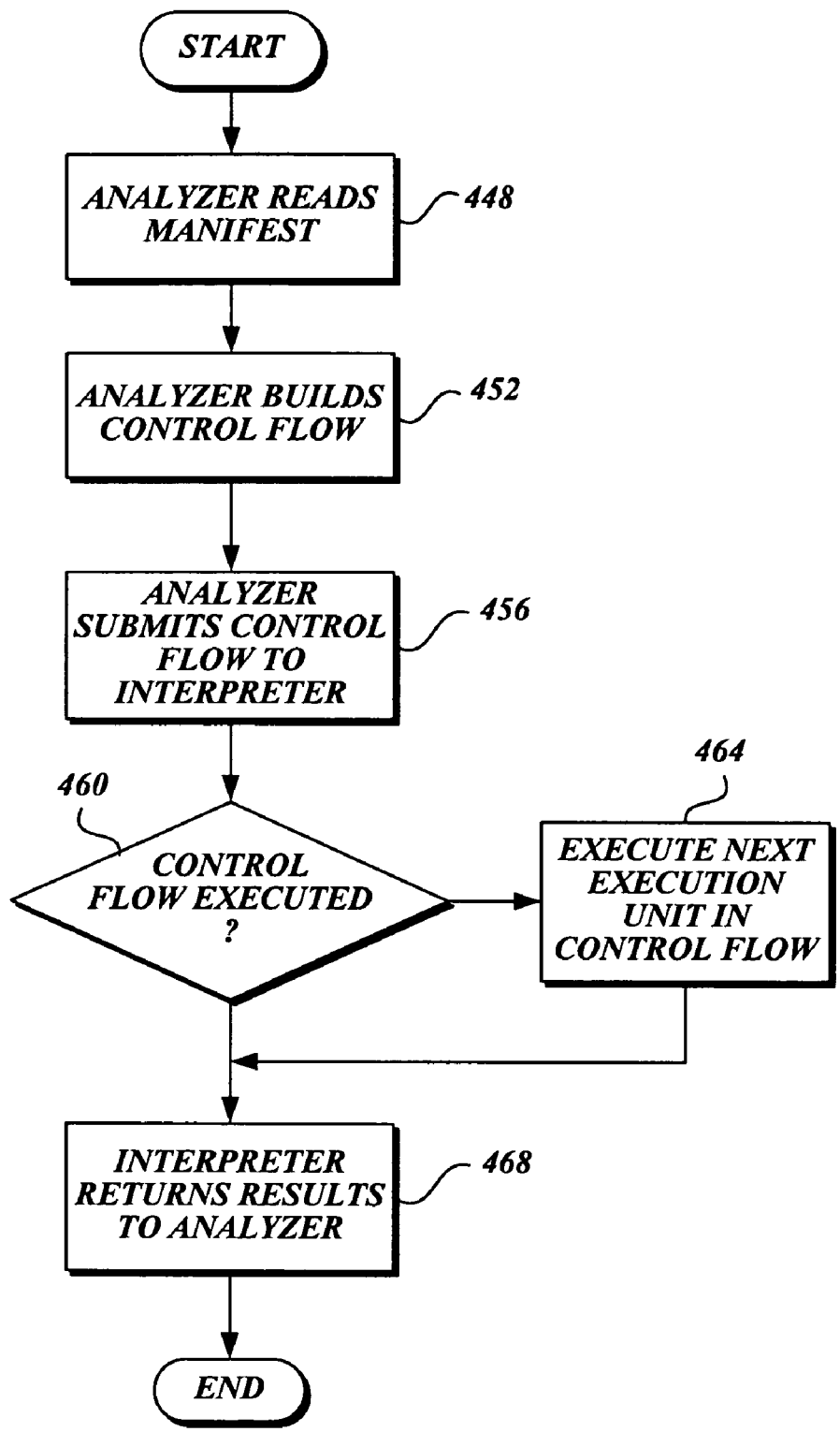
FIG. 6 is a flow diagram illustrating an exemplary control flow execution procedure.

An example of how an analyzer, for example, a system analyzer 352, uses an execution unit repository 320 is shown in FIG. 6. At block 448, the analyzer 352, reads the manifest 404. At block 452, the analyzer 352 builds a control flow 436 by selecting execution units from the manifest 404 and using the selections to assemble entries in the control flow 436. The analyzer 352 selects an execution unit by examining the input parameters 420 the execution unit requires and the output values 424 the execution unit may return. After selecting an execution unit, the analyzer 352, creates an entry in the control flow 436. The control flow entry includes the reference 416 to the execution unit 416, which is entered as the reference 440 in the control flow. The analyzer 352, then inserts the input value, or values, the execution unit requires.

After the analyzer 352 has completed a control flow 436, at block 456, the analyzer 352 submits the control flow 436 to the interpreter 408 in the execution unit repository 400. At block 460, the interpreter 408, steps through the sequence of execution units contained in the control flow 436. At block 464, the interpreter 408 uses the execution unit reference 440 in the control flow 436 to select a diagnostic task 432 from the store 412. The interpreter 408 then submits the input values 444 from the control flow entry to the diagnostic task 432, which is then executed. After all of the entries in the control flow 436 have been executed, at block 468, the interpreter 408 returns the data resulting from the execution of the entire sequence of execution units to the analyzer 352.

As will be readily appreciated by those skilled in the art from the exemplary procedure explained above and shown in FIG. 6, an expert diagnostic agent can use an execution unit repository to dynamically make decisions about how to collect state data and how to transform the state data into state information.

Figure 7:
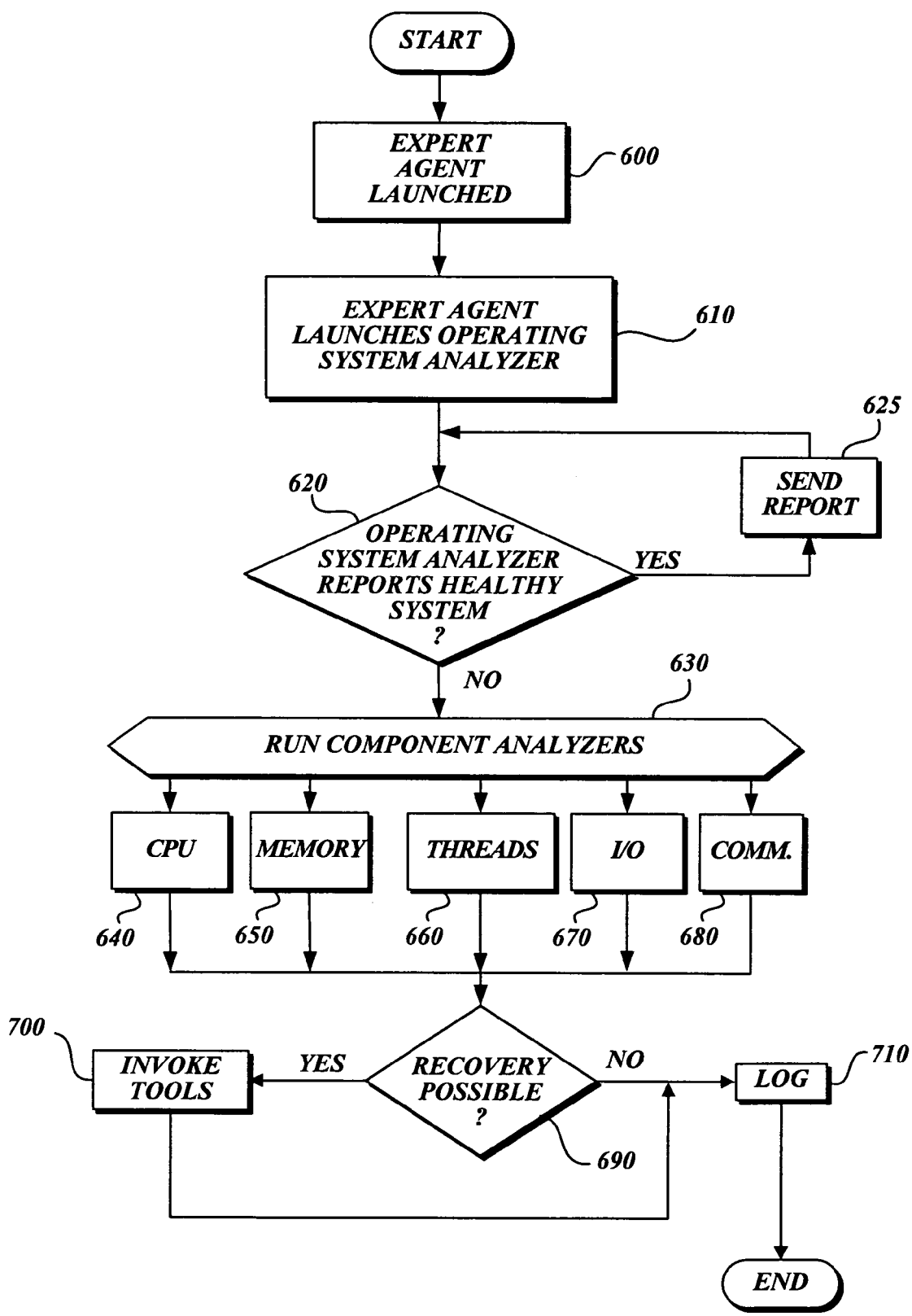
FIG. 7 is a flow diagram illustrating an exemplary expert diagnostic agent procedure.

FIG. 7 illustrates an exemplary sequence of events that may occur when the exemplary expert diagnostic agent 312 illustrated in FIG. 3 detects a soft failure. The purpose of FIG. 7 and the following explanation is to show, in an uncomplicated way, how the major components of a FIG. 3 exemplary expert diagnostic agent 312 work together to detect a soft failure. FIG. 7 and the following discussion should be construed as exemplary and not limiting on the present invention.

At block 600, the expert diagnostic agent 312 is launched. At block 610, the expert diagnostic agent 312, specifically, the rules database 316 launches an operating system analyzer 352. At block 620 in response to a user request for diagnosis, a test is made to determine if the operating system analyzer 352 is reporting a healthy system. More specifically, a user 300 request for diagnosis 304 is processed by the rules database 316, which sends a request for operating system state 332 to the operating system analyzer 352. The operating system analyzer 352 returns operating system state information 340 to the rules database 316. The rules database 316 inserts the operating system state information 340 into the appropriate parameters of one or more rules. If the rules insertion creates rules indicating that the operating system is operating within design parameters, a suitable report 625 is sent to the user. Contrariwise, if the rules insertion creates rules that indicate that the operating system is not operating within design parameters, a soft failure has been detected. The detection of a soft failure results in a decision to collect more information about a particular component (or components), such as a disk drive associated with the soft failure.

At block 630, the rules database 316 uses one or more rules to select one or more software component analyzers from among a plurality of software component analyzers associated with the component that is associated with the soft failure. Examples of analyzable components include, but are not limited to, a CPU 640, memory 650, threads 660, input/output (I/O) devices 670, and communication ports 680. In the case of a disk drive, the rules database 316 selects a software component analyzer, e.g., software analyzer 356, for an I/O device whose interface matches the interface of the software driver of the disk drive in question, e.g., the software component 384. The rules database 316 launches the software component analyzer 356 associated with the disk drive. The software component analyzer 356 collects data concerning the performance of the software component 384, i.e., the software driver for the disk drive. The rules database 316 issues a request for state 332 from the software component analyzer 356. The software component analyzer 356 returns information about the state 340 of the disk drive received from the software driver for the disk drive to the rules database 316. The rules database 316 submits information about the state 340 of the disk drive to one or more rules which results in a decision, at block 690, whether recovery from the soft failure is or is not possible. If recovery is not possible, the rules database 316 enters the results of the foregoing procedure in a log 710 and, preferably, returns the results as diagnostic information 308 to the user 300. If, at block 690, the rules database 316 determines that recovery from the soft failure is possible, the rules database 316 issues a request for a tool 328 from the tools suite 336. The tools suite 336 then activates a tool and returns results from the use of the tool 324 to the rules database 316. The rules database 316 either logs a successful result or an unsuccessful result. Or, while not shown, the rules database may make decisions regarding other ways to possibly correct the soft failure.

Figure 8:
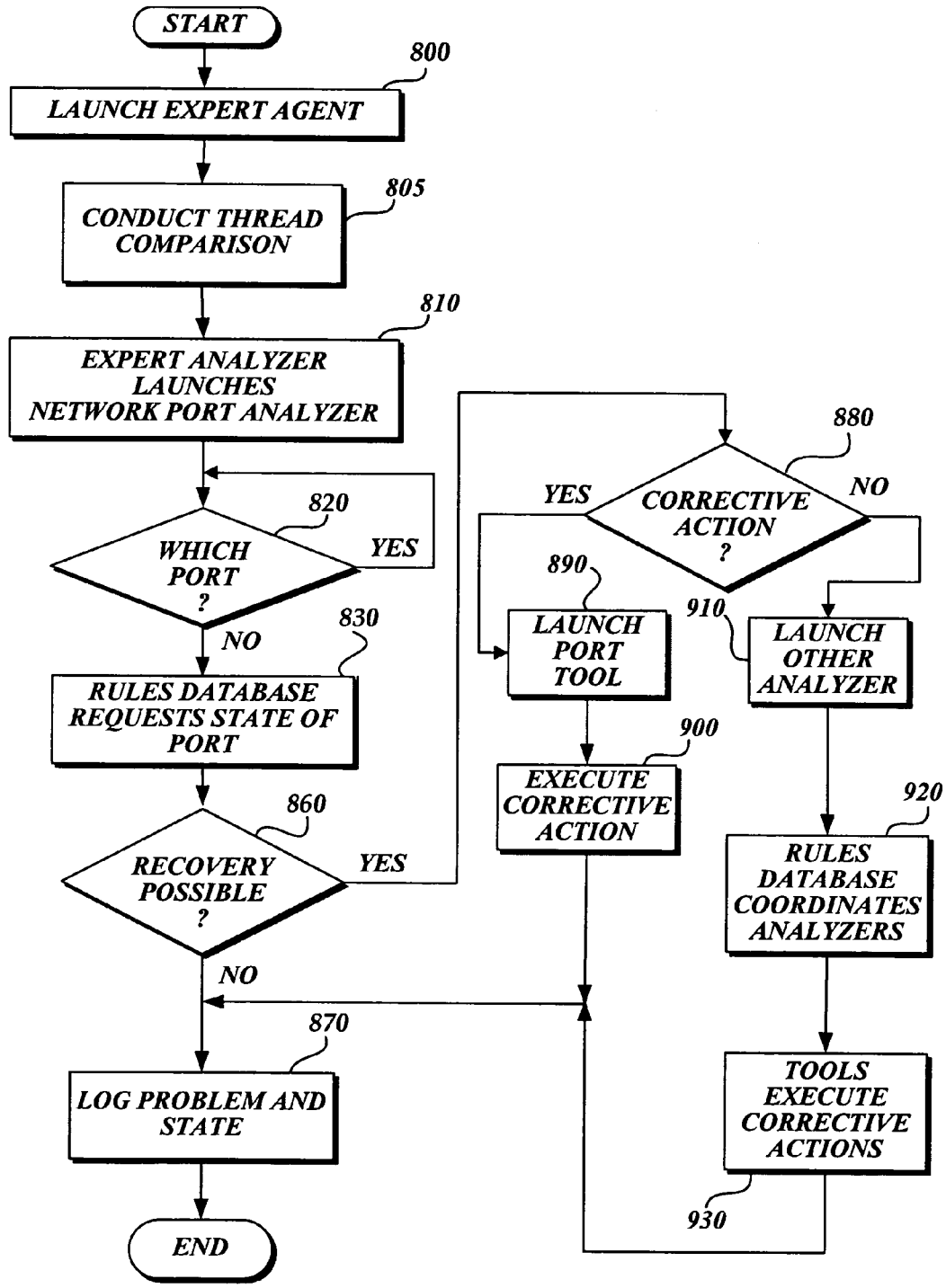
FIG. 8 is a flow diagram illustrating another exemplary expert diagnostic agent procedure.

FIG. 7 and the previous discussion described one exemplary operation of the expert diagnostic agent illustrated in FIG. 3 when detecting a soft failure, FIG. 8, and the following discussion describes a different exemplary operation when detecting a soft failure. The symptoms of the exemplary soft failure associated with FIG. 8 are: the user is intermittently unable to access the Internet while still being able to access email. As a result, a computer support technician instructs the user to launch the expert diagnostic agent 312.

At block 800, the expert diagnostic agent 312 is launched. As before, in response, the rules database 316 launches the system analyzer 352, i.e., the rules database sends a request for state 332 to the system analyzer 352. As before, the system analyzer 352 returns state information 340 about the state of the operating system 368. Among other information, the system state information 340 includes information about the processing unit 140 (FIG. 2) from a Processor Control Block (PRCB) included in the processing unit 140 and information about the system memory 150. Those skilled in the art will recognize that a PRCB as a part of a computing device in which the kernel of an operating system may store per-processor information that is available to a variety of software analysis tools.

Using rules regarding processor activity and memory consumption to compare information from the PRCB and information about the system memory 150 to a healthy model, in this example, the rules database 316 determines that the processor activity and the rates of memory consumption and release are normal.

At block 805, using one or more rules regarding thread pools, the rules database 316 compares the thread pool information included in the system state information 340 to the thread pool information in a healthy model. In this example, the comparison reveals an unresponsive thread in the thread pool, identifies the unresponsive thread, and returns an unresponsive thread code, i.e., a code indicating that there is an unresponsive thread in the thread pool, and a reference to the unresponsive thread. The rules database 316 submits the unresponsive thread code and the unresponsive thread's reference to one or more rules concerning unresponsive threads. One of the rules concerning unresponsive threads causes the rules database 316 to launch a port analyzer 810. Launching the port analyzer causes the appropriate software analyzer, e.g., software component analyzer 360 to interrogate the software component, e.g., software component 388 associated with the appropriate hardware component. In this example, the software driver for the serial ports is interrogated.

Launching the port analyzer results from the rules database 316 sending a request for the software component state 332 to the software component analyzer 360. The software component analyzer 360 returns the software component state information 340. Since, in this example, the software component analyzer 360 is associated with the serial port driver, the software component state information 340 includes information about each of the serial ports. The rules database 316 steps (block 820) through the list of serial ports contained in the software component state and submits each port and the unresponsive thread's reference to one or more rules concerning serial ports. One of the rules concerning serial ports identifies one of the ports as the owner of the unresponsive thread.

At block 830, the rules database 316 sends a request for the software component state 332 to the software component analyzer 360. The request for the software component state 332 contains a reference to the identified port. The software component analyzer 360 returns software component state information 340. Since the request for the software component state 332 contained a reference to the identified port, the software component state information 340 includes information about the identified port. In this example, the port information includes an indication that a Transmission Control Protocol/Interrupt Protocol(TCP/IP) session on the identified port is not making progress and that an Input/Output Request Packet (IRP) on the identified port is not making progress. Those skilled the art will recognize a TCP/IP session as a discrete instance of network communication and further recognize an IRP as a data structure used to request the services of an input or output device.

At block 860, the rules database 316 submits the information about the identified port to one or more rules governing the recovery of serial ports. The result returned by a rule governing the recovery of serial ports either causes the expert diagnostic agent 312 to log the problem and state (block 870) or causes the expert diagnostic agent to decide if corrective action is possible (block 880).

If the expert diagnostic agent 312 logs the problem and state (block 870), the expert diagnostic agent 312 does nothing further concerning the soft failure. Problem and state logs electronically provide computer support personnel with information that in the prior art has been gathered manually by a user and/or computer support personnel. Logging such information assists computer support personnel in focusing on the problem that caused the soft failure, thus reducing the time and effort needed to resolve the failure.

If the expert diagnostic agent 312 decides that corrective action (block 880) is possible, the rules database 316 sends a request for a tool 328 to the tools suite 336. The request for a tool 328 may contain a reference to the identified port and a request to restart the port. If the tools suite 328 contains a suitable tool, i.e., a software driver for the serial ports, the tools suite launches the tool (block 890). The tool executes the corrective action, i.e., in this example, restarting the identified port (block 900). The expert diagnostic agent 312 logs the problem and state (block 870).

If, at block 880, the expert diagnostic agent 312 decides that corrective action cannot be taken, because, for example, the tools suite 336 does not contain a suitable tool, the rules database 316 may launch another software component analyzer (block 910). For example, a software component analyzer 364 for other communication connections 230 that may provide other information to help resolve the soft failure may be launched. At block 920, the rules database 316 coordinates the activities of software component analyzers 360 and 364 to gather more, and more specific, information. At block 930, the rules database 316 sends a request for a tool 328 to the tools suite 336. The request for a tool 328 activates a corrective action tool.

Obviously the sequence just described has been illustrated in a very simplified manner in FIG. 8. Various loop backs executed during the process are not shown in order to not unduly complicate FIG. 8. After the occurrence of successful corrective action, or all appropriate analyzers have been launched, a log of the problem and state is created (block 870).

As will be readily appreciated by those skilled in the art and others, embodiments of the invention provide a method, apparatus, and computer-readable medium suitable for automatically diagnosing computer software failures. While the preferred embodiment of the invention has been illustrated and described, it will be appreciated that various changes can be made therein without departing from the spirit and scope of the invention as defined by the appended claims. For example, actual embodiments of the invention may exclude an execution unit repository and/or a tools suite without departing from the spirit and scope of the invention.

The embodiments of the invention in which an exclusive property or privilege is claimed are defined as follows:

1. A method of diagnosing software failures in a computing device that manifest themselves when the computing device executes instructions, said method comprising:
(a) gathering data reflecting the state of the operating system of the computing device;
(b) gathering data reflecting the state of software components coupled to the operating system;
(c) retrieving rules suitable for identifying the cause of software failures; and
(d) applying said rules to said gathered data to identify software failures in said computing device;
wherein said data reflecting the state of the software components is only gathered if the gathered data reflecting the state of the operating system results in an inference that the computing device is not operating within predetermined parameters.

2. The method of claim 1, wherein said data reflecting the state of the operating system of the computing device is gathered by launching a system analyzer coupled to the operating system of the computing device.

3. The method of claim 2, wherein the launching of said system analyzer results in gathering information suitable for determining if said computing device is or is not operating within predetermined parameters.

4. The method of claim 1, wherein said data reflecting the state of software components coupled to said operating system is gathered by launching component analyzers coupled to related software components.

5. The method of claim 4, wherein the launching of a component analyzer results in gathering information suitable for determining if the software component related to the component analyzer is operating within predetermined parameters.

6. The method of claim 1, wherein said rules are formed by IF <A> THEN <B> parameterized rule statements.

7. The method of claim 6, wherein said parameterized rule statements are applied to said gathered data to identify failures in said computing device by entering said gathered data in the parameters of said parameterized rule statements.

8. The method of claim 1 wherein said data is gathered simultaneously with the operation of said computing device.

9. The method of claim 1, including launching a repair tool in response to the identification of a software failure in said computing device.

10. An expert diagnostic agent for diagnosing software failures in a computing device when the computing device executes instructions, said expert diagnostic agent comprising:
(a) a system analyzer coupled to the operating system of a computing device for gathering data reflecting the state of the operating system of said computing device;
(b) a plurality of component analyzers, each of said component analyzers coupled to related software components of said computing device for gathering data reflecting the state of said components; and
(c) a rules database coupled to said system analyzer and said component analyzers for causing said system analyzer and said component analyzers to gather data and for analyzing said gathered data to identify software failures in said computing device;
wherein said component analyzers only gather data reflecting the state of said software components if the data gathered by said system analyzer results in an inference that the computing device is not operating within predetermined parameters.

11. The expert diagnostic agent claimed in claim 10, also including a tools suite containing tools for repairing software failures in said computing device.

12. The expert diagnostic agent claimed in claim 11, wherein a tool from said tool suite is launched in response to said rules database identifying a software failure.

13. The expert diagnostic agent claimed in claim 10, including an execution unit repository for creating and executing a flow control.

14. The expert diagnostic agent claimed in claim 13, wherein said execution unit repository includes a manifest and an interpreter.

15. The expert diagnostic agent claimed in claim 14 wherein said execution unit repository dynamically makes decisions regarding data gathered by said system analyzer and said component analyzers.

16. A computer-readable storage medium, including computer-executable instructions that, when executed, cause a computing device to:
(a) gather data about the operating system of the computing device;
(b) gather data about the operation of a plurality of software components controlled by the computer operating system;
(c) retrieve rules from a rules database;
(d) apply said rules to said gathered data; and
(e) infer the state of the computing device from the results of the application of said rules to said gathered data;
wherein said data about the operation of the plurality of software components is only gathered if the data gathered about the operating system results in an inference that the computing device is not operating within predetermined parameters.

17. The computer-readable storage medium as claimed in claim 16, wherein the gathered data about the operation of the plurality of software components includes parameter information.

18. The computer-readable storage medium as claimed in claim 17, wherein the rules are parameterized rule statements suitable for applying said parameter information and wherein inferring the state of the computing device includes inserting said parameter information in said parameterized rule statements.

19. The computer-readable storage medium as claimed in claim 16, wherein the data about the operating system of the computing device is gathered by launching a system analyzer coupled to the operating system of the computing device.

20. The computer-readable storage medium as claimed in claim 16, wherein the data about the operation of the plurality of software components is gathered by launching component analyzers coupled to related software components.

* * * * *